United States Patent [19]
LaPointe et al.

[11] Patent Number: 5,377,165
[45] Date of Patent: Dec. 27, 1994

[54] COMMUNICATION SYSTEM FOR SUBMARINES

[75] Inventors: Kenneth M. LaPointe, Narragansett, R.I.; Ronald E. Waclawik, Fairhaven, Mass.; Robert C. Thibodeau, Wakefield, R.I.

[73] Assignee: The United States of America as represented by the Secretary of the Navy, Washington, D.C.

[21] Appl. No.: 243,025

[22] Filed: May 5, 1994

[51] Int. Cl.$^5$ .............................. H04B 13/02
[52] U.S. Cl. ................................. 367/134; 367/133; 340/850; 114/328
[58] Field of Search ................. 367/131, 133, 134; 340/850; 114/21.1, 328; 441/1, 11

[56] References Cited

U.S. PATENT DOCUMENTS 5,291,194  3/1994  Ames ............................. 340/850

Primary Examiner—Daniel T. Pihulic
Attorney, Agent, or Firm—Michael J. McGowan; Prithvi C. Lall; Michael F. Oglo

[57] ABSTRACT

Submarines are provided with underwater self-propelled vehicles that are launched from the submarines and guided by trailing fiber optic cables. Each underwater vehicle has a hull that is separable, and that defines a socket for mating with one end of the separable forward hull portion of another identical vehicle. The separable hull portions of one vehicle, when separated remain connected by a fiber optic line so that a homing device on this line can be used to link up with the transponder aboard the other vehicle. Wings on the latter vehicle guide the line toward a socket that accepts or mates with the end of the one vehicle hull portion.

6 Claims, 2 Drawing Sheets

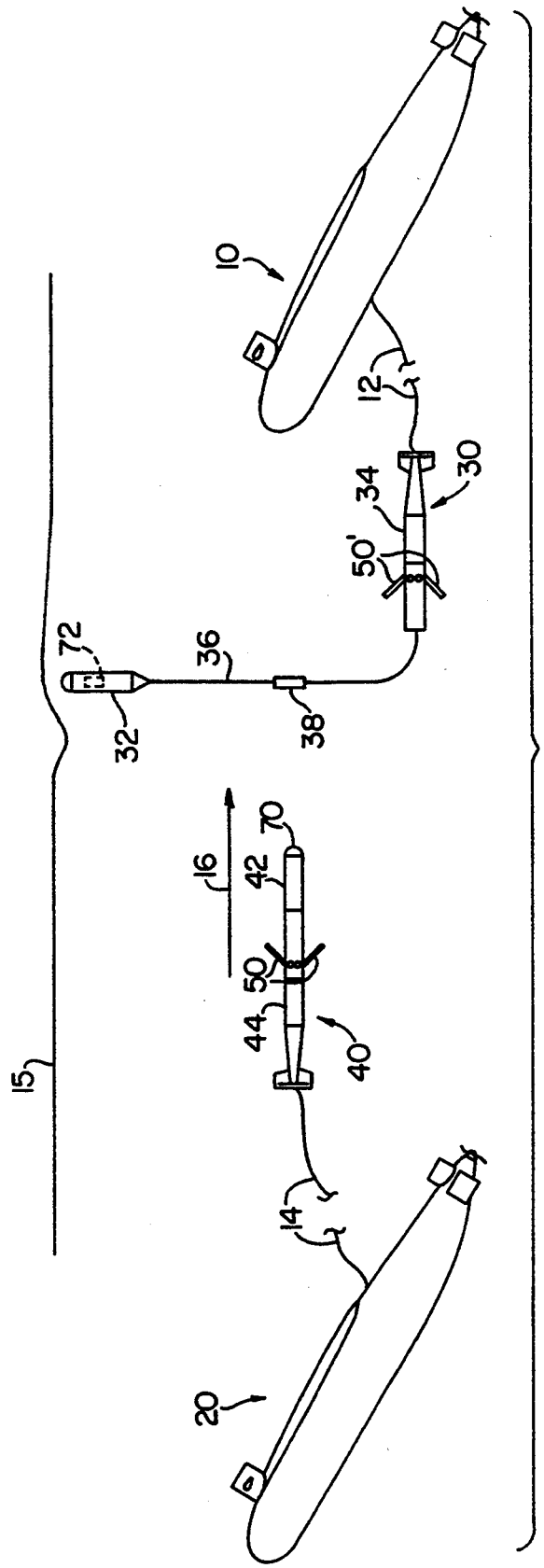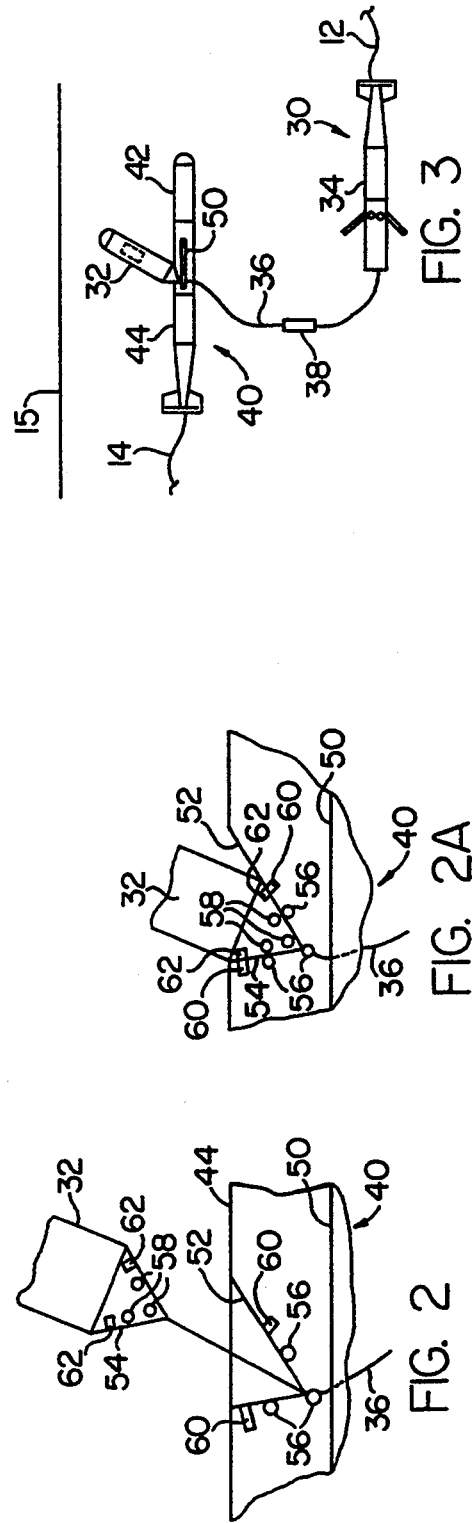

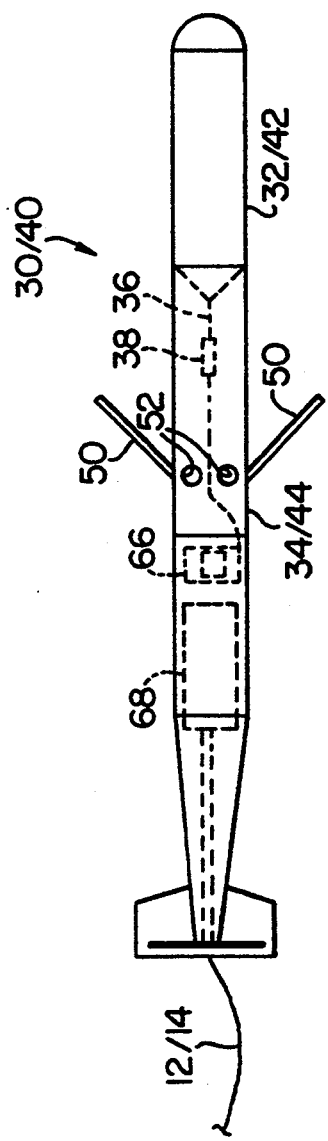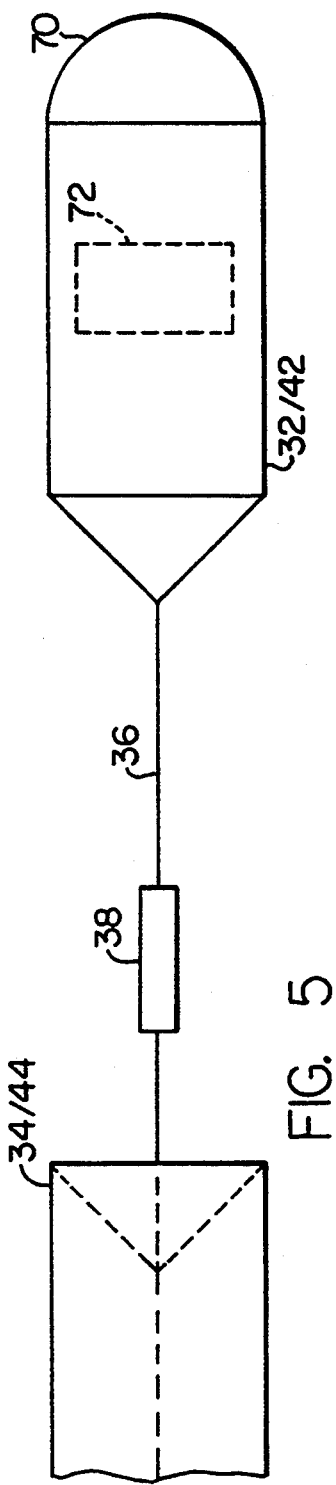

COMMUNICATION SYSTEM FOR SUBMARINES

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates to communication via direct cable connection between submerged vessels such as submarines, and deals more specifically with a system for providing a direct optical coupling or link between submarines capable of launching undersea vehicles, and controlling these vehicles via fiber optic cable.

(2) Description of the Prior Art

Fiber optic cable connections have been proposed in the prior art. For example see U.S. Pat. No. 5,291,194 to Gregory Ames entitled "Apparatus For Interconnecting An Underwater Vehicle And A Free-Floating Pod", assigned to the United States Navy. This '194 patent discloses a system for providing communication between a submarine and an underwater device by deploying an underwater vehicle which is guided toward the underwater device for making a connection with the underwater device.

Other prior art of more remote relevancy to the present disclosure can be summarized as follows. U.S. Pat. No. 1,634,964 to Steinmetz discloses a mooring system for a dirigible in which capture arms are provided for engaging a mooring cable. U.S. Pat. No. 2,887,732 to Eaton discloses a torpedo construction comprising interconnected cylindrical sections. U.S. Pat. No. 3,175,525 to De Vries discloses a gas bag retained within a recovery section of a torpedo, and useful to float the otherwise non-buoyant torpedo. U.S. Pat. No. 3,757,722 to Seiple discloses a docking system for an underwater vehicle that is adapted to home in on a transducer mounted on a deployed mooring line. Guide arms on the vehicle capture the line and the vehicle travels along the line so as to permit a catch on the line to be received in a socket mounted at the apex of the arms. U.S. Pat. No. 4,271,552 to Sandler discloses a torpedo flotation device. U.S. Pat. No. 5,078,069 to August discloses a sectional torpedo that includes guidance and control means as well as internal propulsion means.

The chief object of the present invention is to provide a system whereby a submarine together with its associated undersea vehicle can be linked with the undersea vehicle of a second submarine so as to provide a direct optical link or connection between the two submarines. Such a direct link or coupling with its capability of fiber optical communication between the two submarines would provide further covert communication between the two submarines, and represent a substantial improvement over present communication systems of the type that require radio links or other non-covert elements to complete a communication connection between two submarines at sea.

SUMMARY OF THE INVENTION

The foregoing objects and advantages are achieved with the present invention by providing at least two and conceivably a plurality of underwater vessels or submarines, each of which submarines has underwater vehicle storage and launching capability and the capability of providing a fiber optic cable between the launched vehicle and the submarine for guidance of the underwater vehicle. Self-propelled underwater vehicles are provided on each submarine and each vehicle includes not only a trailing cable for direct communication between the vehicle and the submarine from which it is launched, but each vehicle comprises a forward and aft hull portion that are separable one from the other, the first or forward hull portion having a buoyant device so as to provide a buoyant force on this first or forward hull portion that urges that particular hull portion in the direction of the water surface when separated from the second or aft hull portion. Further, these hull portions of each of these underwater vehicles are connected to one another by a fiber optic line with either a homing device or a transducer device provided on this line. The transducer device is responsive to the homing device whereby one or both devices can be activated, at least when the first or forward hull portion has been separated, in order to permit the other of said devices in the other of said vehicles to locate said one vehicle. Once this location has been determined the other of the vehicles can home in on or be guided toward the one vehicle so as to form a direct connection with it. Direct communication is then provided underwater over a high band width optical link which is covert in deployment and in use. Both underwater vehicles are of identical construction, and either underwater vehicle can be separated so as to provide such a direct optical connection between two vehicles and hence between the submarines from which they were launched. Each vehicle includes at least one and preferably two projecting fiber optic line capturing wings extending outwardly of the vehicle's hull. These wings are adapted to engage and to guide the fiber optic cable into an associated socket defined in the hull of each vehicle for this purpose. Each vehicle has a first hull portion with a trailing end that is designed to fit into such a socket and to thereby achieve an optical coupling therebetween. In addition, latching means is provided for securing the trailing end of the first hull portion of one vehicle to the socket defined in the second vehicle.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein:

FIG. 1 shows two submarines that have launched underwater vehicles, one of the vehicles is shown after having deployed it's buoyant hull portion and the other vehicle is shown homing on a homing device provided in the first vehicle;

FIG. 2 shows in side elevation to an enlarged scale the hull portion of the homing vehicle and the aft or trailing end of the deployed hull portion of the first vehicle with these structures being in the process of being mated with one another;

FIG. 2A shows in side elevation the structure of FIG. 2 after the mating of the vehicles.

FIG. 3 shows the underwater vehicle in position for providing a direct optical link between the two and hence between the two submarines (not shown);

FIG. 4 is an enlarged top plan view of one of the underwater vehicles illustrating in schematic fashion its internal components; and FIG. 5 is a view of the forward hull portion after initial separation from the aft or second hull portion of the underwater vehicle of FIG. 4.

DESCRIPTION OF THE PREFERRED EMBODIMENT

Referring now to FIG. 1, there is shown a first submarine 10 in the process of establishing communication with a second submarine 20 in accordance with the invention. The first submarine 10 has launched a first underwater vehicle 30, and the underwater vehicle 30 has deployed its separable nose cone or forward hull portion 32. This deployed forward, or first hull portion 32 of the underwater vehicle 30 has floated toward the water surface 15 by reason of an internal gas bag 72 that renders this hull portion 32 buoyant in sea water. This first mentioned hull portion 32 remains connected to the aft or second hull portion 34 of the vehicle 30 by a fiber optic line 36, which fiber optic line 36 carries a homing device 38. The homing device can be activated from the first submarine 10 through the fiber optic line 12. The cable or line 12 serves to provide a direct connection and communication link between the first submarine 10 and the aft portion 34 of the first underwater vehicle 30.

The second submarine 20 is shown in FIG. 1 as having launched an identical underwater vehicle 40. An important feature of the present invention is that underwater vehicles carried aboard all submarines are identical in configuration and capability, that is, these underwater vehicles can be launched from and guided by their submarines. The vehicle 40 is provided with the same forward hull portion 42 as referred to previously with reference to the forward hull portion or nose cone 32. The first hull portion 42 of the vehicle 40 is still connected to its aft hull portion 44, and a second fiber optic cable 14 connects this second underwater vehicle 40 to the submarine 20 for guidance control. Thus, the second submarine 20 can provides signals to its underwater vehicle 40 and hence to its nose cone 42 so as to activate a transponder 70 in the nose cone 42 that will permit the underwater vehicle 40 to home in on or to swim toward the homing beacon 38 as indicated generally by the arrow 16.

Each underwater vehicle 30 and 40 includes at least one and preferably a pair of projecting cable engaging wings 50, 50' that extend preferably horizontally from the vehicle so that once the process involving transponder to, homing beacon 38, and the guidance control provided from submarine 20 has caused the forward hull portion 42 of vehicle 40 to move to the homing beacon 38 the inertia of the vehicle 40 due its speed will cause one of the wings 50, 50 to engage the cable 36.

Referring now to FIG. 2, the upper surface of the hull of the aft portion 44 of the vehicle 40, includes a socket 52, which socket 52 is configured to receive the conical trailing end 54 of the first or forward hull portion 32. FIG.2 depicts the relationship between the forward hull portion 32 of vehicle 30 and the aft portion 44 of vehicle 40 when fiber optic line 36 has been engaged by wings 50, but before the conical trailing end 54 of hull portion 32 is seated in the conical recess, or socket 52 in aft portion 44 of vehicle 40. The deployed hull portion 32 is being pulled toward the upwardly open recess 52 in the aft hull portion 44 of the vehicle 40. In FIG. 2A the aft end 54 of the forward hull portion 32 is in socket 52, providing an arrangement of abutting conical surfaces. The socket 52 is provided with optical windows 56 that are shown schematically in FIGS. 2 and 2A. Those of optical windows 56 that are located intermediate the apex and base of conical recess 52 may be annular in form (circumscribing an annular band of the surface of revolution of recess 52). The optical window 56 at the apex of recess 52 may be shaped to complement the shape of the conical apex at the end 54 of forward hull portion 32. The conical rear end of hull portion 32 has optical windows 58 that mate with complementary windows in socket 52, to permit optical coupling and communication between the vehicle 40 and the forward hull portion 32 of the submarine 30.

In addition, latching or detent means 60/62 is provided in part on the aft hull portion 44 and in part on the forward hull portion 32 so as to achieve a positive connection between these components of both vehicles 30 and 40. The latching devices serve to retain proper alignment between the optical windows 56/58 and preferably comprise spring biased plungers that engage a mating annular groove a to achieve a latched or detented junction.

FIG. 3 illustrates the overall configuration for the two underwater vessels 30 and 40 when they are optically linked by the fiber optic line 36 and above described connection provided between the hull portion 44 of the vehicle 40 and the aft end 54 of the forward hull portion 32 of the vehicle 30.

FIGS. 4 and 5 show either underwater vehicle 30/40, which are identical to one another, in somewhat greater detail. FIG. 4 shows the vehicle in its deployed configuration seeking the homing device of the generally vertically extending fiber optic line. FIG. 5 shows the underwater vehicle forward portion shortly after it has been deployed from the aft hull portion and prior to the forward portion being biased toward the water surface by its buoyancy.

The underwater vehicle 30/40 of FIG. 4 includes an elongated generally cylindrical hull that includes the forward hull portion 32/42 and aft or second hull portion 34/44. The projecting wings 50, 50 extend horizontally from the hull aft portion as shown.

As shown in FIG. 4 a spool 66 of fiber optic line is provided in the aft portion 34/44 of the vehicle, and the fiber optic line deployed from this spool is adapted to continually provide an optical link between the aft portion of the vehicle and its deployed forward position or nose cone as best shown in FIG. 5. The fiber optic line is payed off the spool 66 for this purpose. The line 36 carries the homing device or beacon 38 as best shown in FIG. 5.

Still with reference to the vehicle 30/40 of FIG. 4 the aft hull portion also includes guidance and propulsion means indicated generally at 68, so as to provide remote control from the submarine (not shown) through fiber optic cable 12/14. The guidance and propulsion means will not be described in detail as such equipment is well known in this art.

Referring now to the forward hull portion or nose cone 32/42 a transponder indicated generally at 70 is provided in the nose of each first or forward hull portion 32/42 for homing in on the beacon 38 upon command from the overall system, and preferably from the submarine from which it is launched. The forward hull portion 32/42 is buoyant to achieve vertical movement of the deployed forward hull portion 32/42 so that the position of FIG. 1 will be assumed as described previously, and thereby facilitate engagement between the vehicle launched from the second submarine and the homing beacon 38 on cable 36 deployed by the first vehicle.

In light of the above, it is therefore understood that within the scope of the appended claims, the invention may be practiced otherwise than as specifically described.

What is claimed is:

1. A system for establishing direct communication between two of more underwater vessels such as submarines, these submarines each having underwater vehicle launching and guidance capability, said system comprising:

a self-propelled underwater vehicle adapted to be launched from and guided by an underwater vessel such as a submarine, said underwater vehicle including a trailing cable connected to the submarine for communication between the underwater vehicle and the submarine from which it is launched;

said underwater vehicle including first and second hull portions, said hull portions being separable from one another and said first hull portion being buoyant to bias said first hull portion in the direction of the water surface when separated from its associated second hull portion, said hull portions remaining connected to one another by a fiber optic line after being separated, said vehicle having both a homing device and a transducer device responsive to said homing device whereby one such vehicle and its associated homing or transducer device can be activated at least when its said first hull portion has been separated to permit the other of said devices in another of said underwater vehicles to locate said one underwater vehicle device and be guide toward it.

2. The system according to claim 1 wherein one of said transducer and homing devices is provided on said fiber optic line, and wherein the other of said transducer and homing device is provided in the first hull portion of said other underwater self-propelled vehicles.

3. The system according to claim 2 wherein said underwater self-propelled vehicles include at least one fiber optic line capturing wing extending outwardly of the vehicle hull and adapted to guide said fiber optic line from said deployed first hull portion into an outwardly open socket defined in the hull of said underwater self-propelled vehicle.

4. The system according to claim 3 wherein said one self-propelled underwater vehicle first hull portion has one end associated with said fiber optic line and said one end having a geometry to be received in said socket whereby an optical coupling is provided between said first hull portion of said one vehicle and said socket defining hull of the other of said self-propelled underwater vehicles.

5. The system according to claim 4 further characterized by latching means for securing said one end of said one self-propelled underwater vehicle first hull portion in said socket of said other vehicle hull.

6. The system according to claim 4 further characterized by means for storing said fiber optic line, said means including a spool in said second hull portion.

* * * * *